July 8, 1952     H. TOMOSER     2,602,592
THERMOSTATIC VALVE
Filed June 12, 1948
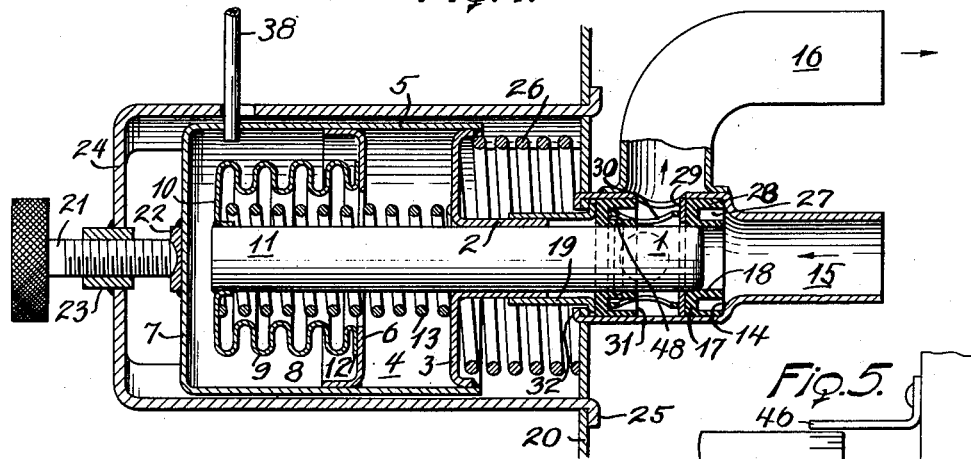
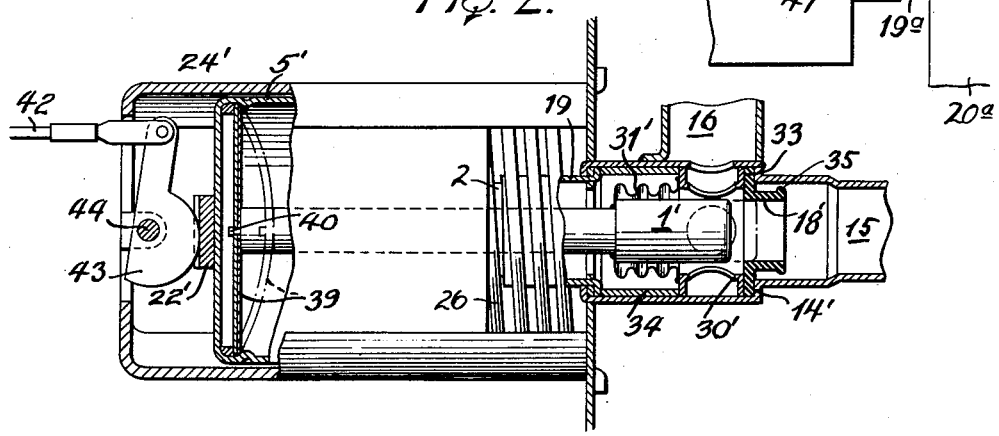
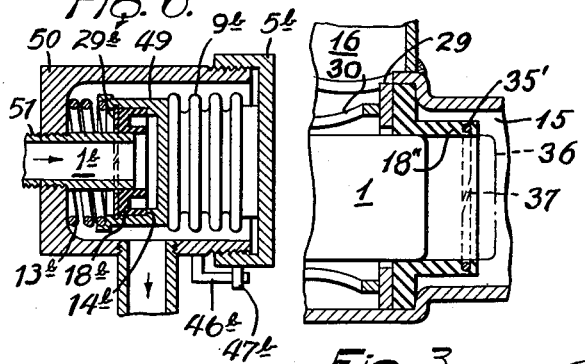
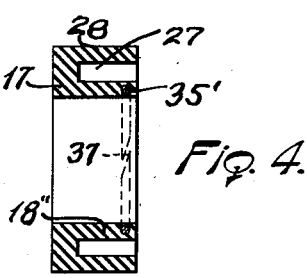
INVENTOR
*Herbert Tomoser*
BY
*Bean, Brook, Buckley & Bean*
ATTORNEYS Patented July 8, 1952

2,602,592

UNITED STATES PATENT OFFICE 2,602,592

THERMOSTATIC VALVE

Herbert Tomoser, Kenmore, N. Y.

Application June 12, 1948, Serial No. 32,666

15 Claims. (Cl. 236—99)

This invention relates to the valve art and especially to the thermostatic valve field in which the opening and closing movements of the valve are regulated or controlled by thermostatic means. In the prior art the valve has been positively seated against further movement when in a closed position, and consequently higher temperatures will tend to strain the delicate parts likely to disrupt the sensitivity of the thermal responsive means so that in the subsequent usage the original efficiency of the valve has become somewhat impaired.

The primary object of the present invention is to provide a thermostatic valve which will maintain its efficiency in closing off fluid flow throughout the life of the thermostatic control. Further, the invention has for its object to provide a thermostatic valve which, when closed, will freely respond to temperature increases and readily accommodate abnormal thermal responsive movement without injury to the delicate and sensitive thermostatic control.

Again, the invention has for its object to provide a valving arrangement which is practical and economical in construction and operation and one which is durable and capable of prolonged usage. Furthermore, the invention has for its object to provide a valve structure which will increase the efficiency and performance of the valve.

The foregoing and other objects will manifest themselves as this description progresses, reference being had to the accompanying drawing, wherein Fig. 1 is a longitudinal sectional view through a thermostatic valve embodying the present invention;

Fig. 2 is a similar view through a modified embodiment, portions being left in elevation;

Figs. 3 and 4 are fragmentary sectional views of further modified showings; and

Figs. 5 and 6 are fragmentary views of other modifications.

Referring more particularly to the drawing, the numeral 1 designates a valve which is slidably supported in a bearing 2 that forms a sleeve extension of an end wall 3 for the spring chamber 4. This chamber is formed within a cup shaped casing 5 and has an intermediate partition 6 cooperating with the closed end wall 7 to form a thermostat chamber 8 in which is confined an expansible fluid that expands and contracts in accordance with temperature changes and thereby reflects its action on the confining thermostatic bellows 9. The bellows may be of a well known design and have its end wall 10 fixed to the stem portion 11 of the valve 1, while its opposite end flange 12 will be hermetically sealed on the partition 6, which latter has a central aperture through which the valve stem extends along with its encircling spring 13 that bears upon the bellows wall 10 and the chamber wall 3 for urging the valve toward an open position. The tension on this spring 13 may be adjusted by suitable means, such as a nut (not shown) threaded on the bearing 2, to regulate the sensitivity of the thermostat. The expansion of the fluid in the chamber 8 will therefore collapse the bellows against the tension of the spring 13 and thereby serve to move the valve toward its seat, while the ensmallment of the thermal responsive fluid body will enable the spring to extend the bellows and slide the valve away from its seat.

The valve seat is supported upon an internal shoulder 14 between the inlet port 15 and the outlet port 16 of a valve chamber, such valve seat 17 being of rubber, or other flexible or yieldable material, and in the form of a cylindrical flange 18 that extends toward the inlet opening and conformably and snugly fits the valve 1 while permitting the latter to slide thereon as moved by the thermostat. For this purpose the flange has its free or outer end spaced from the chamber wall to open the space therebehind to the inlet pressure. Being resilient in character the flange will respond to the inlet pressure and be made thereby to hug or contract about and against the valve element 1 in a sealing contact and under an urge commensurate with the pressure on the fluid in the inlet opening 15. The inner end portion of the flange just beyond the point of anchorage will respond to the inlet fluid pressure as soon as the valve element enters the same to close off fluid movement therethrough. The valve 1 has sliding contact with the inner surface of the flange 18 and, therefore, while the initial entrance of the valving element into the flange will serve effectively to interrupt the fluid flow, nevertheless the element is free to continue its sliding movement into and even through the flange should the thermostat impart such abnormal movement thereto for any reason whatsoever. This accommodation of the valve movement when in a closed position will relieve the bellows of overload and strain. For example, after the valve has arrested the fluid flow, any temperature increase will cause the bellows to contract and thereby slide the element further into its seat 18. Abnormal rises in temperature will move the valving member for a greater extent into the seat whereupon a greater external surface area of the seat forming flange will be acted upon by the inlet fluid pressure to insure a flow arresting seal. A reduction in the temperature will enable the spring 13 to withdraw the valve accordingly from its embracing seat.

Should the valve seat wear at its inner end, means are provided to adjust the valve to seat normally further in the flange on a new active portion of the latter but without altering the setting of the thermostat. To this end the thermostat and valve unit (1, 5, 9) is slidably supported, as by having the sleeve bearing 2 slidable within a fixed bearing 19 on a suitable supporting structure 20. The unit may therefore be adjusted relative to its seat by suitable means, such as by an adjusting screw 21 which bears upon a pad 22 fixed to the end wall 7 and is threaded through a nut 23 on a protective housing 24 which encloses the unit, such housing being suitably attached to the wall structure 20, as by lugs 25 clinched thereon. By turning the screw in its nut 23 the thermostatic valve unit will be adjusted toward or from the valve seat without affecting the sensitivity of the thermostatic control or its spring 13. The embodiment shown in Fig. 1 utilizes the screw thrust for imparting unit movement toward the seat and relies upon a second spring 26 to return the unit away from its seat under the control of the screw when turned outwardly in its nut 23. This second spring bears upon the outer surface of the end wall 3 and also upon the opposing surface of the supporting structure 20 and obviously has no effect upon the thermostatic adjustment of the valve. However, the screw adjustment enables proper initial placement of the valve with respect to its seat as well as adjustment of the valve to new settings for differing thermal conditions. As above stated, this adjustment also enables the repair adjustment of the valve necessitated by possible wear of the inner portion or portions of the seat. By reason of the sliding contact of the valve upon its seat, fluctuations in the temperature will cause the thermostat to move the valve freely back and forth on its seat while retaining the valve in a closed position.

The valve seat may constitute the inner flange of a channeled washer, as illustrated in Fig. 1, with the circular channel 27 of the washer facing the inlet opening to receive the inlet fluid pressure for acting inwardly on the inner flange and outwardly on the outer flange to seal the assemblage against leakage. The outer flange 28 of the channeled washer will seat at its free end upon the shoulder 14 where it is retained by suitable means. This valve seat arrangement forms the subject matter of Patent No. 2,509,656. In the illustrated embodiment the channeled washer is backed by a flat wear plate or ring 29 on which seats one end of a spacer sleeve 30 within the valve chamber, the opposite end of the spacer being received within the channel of a second channeled washer 31 serving as a packing gland about the valve stem. A groove 48 may be formed in the inner face of the packing to hold a lubricant for easing the sliding of the stem therethrough. The valve chamber may be of any external form and is suitably anchored to the support 20 as by means of the clinched lugs 32.

Or the valve seat may be in the form of the circular flange 18' which has a simple peripheral flange 33 extending outwardly therefrom to rest upon the shoulder 14' where it is clamped in position fluid tight by the spacer sleeves 30' and 34. Under extreme pressures the free end of the flange may be given reinforcement against collapsing over the valving part, as when the valve is being opened and the fluid rushes through the seat opening. This reinforcement may be in the form of a simple bead or rim 35, Fig. 2, formed about the free end of the flange, or, as shown in Figs. 3 and 4, a wire ring 35' may be embedded in the free end of the seat forming flange. This ring may be split, as at 37, for opening up to permit through passage of the valve, as shown by the broken line position 36 in an exaggerated position, in the presence of an abnormally high temperature.

Any suitable thermostatic control may be employed. In cases of extreme temperatures the thermostatic chamber 8 may be connected to a bulb, not shown, through a tube 38. The thermal responsive member may be solid, fluid, or a bimetal strip 39, Fig. 2, may be employed and be connected to the valve 1' by a suitable connection 40. The valve 1' is guided in the bearing 2, as in Fig. 1, while the spring chamber is sealed against fluid passage thereinto by means of a corrugated shield 31' fastened at one end to the valve and at its opposite end to the spacer 30'.

Adjustment of the thermostatic valve unit may be accomplished by any suitable means other than the screw 21. For example, a remote control adjustment is shown in Fig. 2 wherein a wire or link 42 is connected to a cam 43 pivotally mounted at 44 in the supporting housing 24', the cam reacting against a pad 22' on the casing 5'.

In lieu of the cam adjustments of Figs. 1 and 2, the thermostatic casing 5a, Fig. 5, may have its valve bearing 2a internally threaded for engaging the external thread of the fixed bearing 19a which projects from the supporting structure 20a. By simply rotating the thermostatic casing upon the bearing 19a, the thermostatic valve unit (1, 5a, 9) will advance toward or retract from the valve seat as the valve slides through the bearing support. The extent of valve adjustment may be determined by suitable means, such as the casing carried dial graduations 45 and a cooperating fixed pointer 46, suitable stop means 47 being arranged to engage the pointer for limiting the degree of rotary movement of the casing. In this embodiment the casing is merely grasped by the hand to thread the stem 2a further on to or off of the bearing 19a for accordingly adjusting the position of the valve 1 with respect to its seat, which latter may be identical with those depicted in the other illustrations on the drawing.

In lieu of the thermostatic adjustment of the valving member, the valve seat may be so regulated. Or, viewing it from another angle, the valve may be considered as being tubular and as carrying the flexible flange and therefore the terms valve and seat are used interchangeably in the claims. Such an arrangement is depicted in Fig. 6 wherein the thermostatic bellows 9b carries a cupped member 49 positioned for receiving or passing over the fixed valve or stem 1b. The channeled rubber seat 18b has its outer flange resting upon a shoulder 14b where it is held by a split retaining ring 29b. The bellows is carried by a casing or cover 5b which is suitably sealed and may be adjustably threaded onto the valve chamber 50, the extent of adjustment being determined by the aid of a pointer 46b and a stop 47b. The fluid temperature acting upon the bellows 9b will cause the seat (or tubular valve) to slide on to or off of the fixed valve (or seat) 1b with or without the assistance of a cooperating valve opening spring 13b. The fixed valve may be adjusted by reason of its mounting threads 51.

In this last described embodiment, as in the other embodiments before described, the casing 5, 5a, 5b, constitutes a support for the thermostatic element, as well as for the valving member 1, 1', 1a, 18b, uniting the three parts for bodily adjustment as a unit. Consequently, movement of the casing, either by rotating the same or by actuating the adjusting screw or cam, will regulate the responsiveness of the valve by moving it closer to or farther from the seat, all without affecting the relationship between the valving member and its thermostat. The valving member is free to drift back and forth on its seat as the thermostat responds to fluctuations in temperature.

The thermostatic valve is efficient in action, durable in operation, and practical and economical in construction. The valve is readily adjustable without affecting the sensitivity of the thermal responsive control and will readily accommodate abnormal thermal responsive movements without injury to the delicate mechanism, and while the foregoing description has been given in detail for clearness and ease of understanding it is without thought of limitation since the inventive principles involved are capable of assuming other physical embodiments without departing from the spirit of the invention and the scope of the appended claims.

What is claimed is:

1. A thermostatic valve comprising a chamber having an inlet and an outlet, an annular valve seat member having an annular flexible and pressure responsive flange mounted at its inner end and having its outer end free and extending toward the inlet to be acted upon by the inflowing fluid, a valving member movable relative to the seat member into and out of the inner end of the flange, the free end of the flange responding to the inlet pressure for sealing against the valving member, and thermostatic means connected to one of said members for shifting the same relative to the companion member for such valving action, the valving member conformably fitting the flange for idly sliding therein subsequent to flow interruption thereby to permit said one member responding to further movement incidental to the thermostatic valving action.

2. A thermostatic valve comprising a chamber having an inlet and an outlet, an annular valve seat having an annular flexible and pressure responsive flange mounted at its inner end in the chamber with its outer end free and extending toward the inlet to be acted upon by the inflowing fluid, a valving member slidable into and out of the inner end of the flange and conformably fitting the same for valving action with the free end of the flange responding to the inlet pressure for sealing against the valving member, thermostatic means connected to the valving member for shifting the latter into and out of the flexible flange, and a movable support for the thermostatic means and the valving member operable to adjust the two as a unit to and from the seat forming flange.

3. A thermostatic valve comprising a chamber having an inlet and an outlet, an annular valve seat having an annular resilient and pressure responsive flange mounted at its inner end in the chamber with its outer end free and extending toward the inlet, a valving member movable toward and from the inner end of the seat while leaving the outer end of the flange free for responding to the inlet pressure for sealing the flange against the valving member, thermostatic means supporting the valving member for adjustment therewith as a unit, and means for effecting unit adjustment.

4. A thermostatic valve having a chamber with an inlet and an outlet and an interposed seat provided with a cylindrical flexible flange extending toward the inlet for responding to the inlet pressure, a valving member having a part conformably fitting the seat and movable axially into the seat flange for closing off the fluid flow and out of the seat more or less for regulating the flow of fluid therethrough, and a thermostatic element connected to the valving member for so moving the latter, said valving member part having a freedom of movement in its closed position within the seat flange for accommodating fore and aft drifting movements thereof by the thermostatic element while maintaining the interruption of fluid flow throughout such drifting movements.

5. A thermostatic valve having a chamber with an inlet and an outlet, a substantially cylindrical seat member, a valving member slidably receiving the seat to a greater or lesser extent with a conforming flow-arresting fit, one member having a limited drift movement upon the other member while in its fully closed position, and a thermostat operatively connected to the movable one of said members for normally moving the same to arrest the fluid flow through the other with the drift provision accommodating excessive thermostatic movement of the movable member to protect the thermostat against injury.

6. A thermostatic valve having a chamber with an inlet and an outlet, an interposed seat through which fluid flows from the inlet to the outlet, a valving member slidable on the seat to a closed position in which it has limited drift movement, a thermostat operatively connected to the valving member for moving the same on the seat to its closed position for arresting the fluid flow therethrough with the drift provision accommodating excessive thermostatic movement of the movable member to protect the thermostat against injury, and a support mounting the valving member and the thermostat for unit adjustment while maintaining its thermostat relationship.

7. A thermostatic valve comprising a chamber having an inlet and an outlet with an internal shoulder therebetween, a rubber-like seat clamped upon the shoulder and being in the form of a cylindrical flange depending from the shoulder toward the inlet for sealing movement in response to the inlet pressure, a valving member arranged in the chamber between the outlet and the seat and movable normally into the cylindrical flange toward the inlet with a conforming fit to arrest fluid flow while being free to move further into the flange subsequent to the arrest of flow, and thermostatic means operable to so move the valving member throughout its range of movement into the flange against the inflowing fluid.

8. A thermostatic valve comprising a chamber having an inlet and an outlet with an internal shoulder therebetween, a rubber-like seat engaged with the shoulder and being in the form of a cylindrical flange depending from the shoulder toward the inlet for being acted upon by the inlet pressure, a valving member arranged in the chamber between the outlet and the seat and movable normally into the cylindrical flange toward the inlet with a conforming fit to arrest fluid flow while being free to move further into the flange to find new sealing engagement therewith, an adjustable support on which the valving member is mounted for such movement, and a thermostatic member carried by the support for bodily adjustment with the valving member while maintaining a fixed thermal response for reacting upon the valving member to move the latter into the flange.

9. A thermostatic valve comprising a chamber having an inlet and an outlet with an internal shoulder therebetween, an elastic seat on the shoulder, a valving member arranged in the chamber between the outlet and the seat and movable into flow arresting contact with the seat while being free to move further into the seat through wear, an adjustable support on which the valving member is mounted for such movement, a thermostatic member carried by the support for bodily adjustment with the valving member while maintaining a fixed thermal response for reacting upon the valving member to move the latter into the flange, said two members being carried by the support for bodily adjustment therewith as a unit, and means adjusting the support for setting the valving member to find a new point of sealing contact on the seat.

10. A thermostatic valve comprising a chamber having an inlet and an outlet with an internal shoulder therebetween, a rubber-like seat clamped upon the shoulder and being in the form of a cylindrical flange depending from the shoulder toward the inlet for sealing movement in response to the inlet pressure, a valving member arranged in the chamber between the outlet and the seat and movable normally into the cylindrical flange toward the inlet with a conforming fit to arrest fluid flow while being free to move further into the flange abnormally, an adjustable support on which the valving member is mounted for such movement, and a thermostatic member carried by the support for bodily adjustment with the valving member while maintaining a fixed thermal response for reacting upon the valving member to move the latter into the flange, the valving member being free to pass entirely through the seat forming flange.

11. A valve comprising a chamber having an inlet and an outlet with an internal shoulder therebetween, a rubber-like seat clamped upon the shoulder and being in the form of a cylindrical flange depending from the shoulder toward the inlet for sealing movement in response to the inlet pressure, a valving member arranged in the chamber between the outlet and the seat and movable normally into the cylindrical flange toward the inlet with a conforming fit to arrest fluid flow while being free to move further into the flange abnormally, an adjustable support on which the valving member is mounted for such movement and a shape retaining ring supporting the free end of the flange against collapse.

12. A valve comprising a chamber having an inlet and an outlet with an internal shoulder therebetween, a rubber-like seat clamped upon the shoulder and being in the form of a cylindrical flange depending from the shoulder toward the inlet for sealing movement in response to the inlet pressure, a valving member arranged in the chamber between the outlet and the seat and movable normally into the cylindrical flange toward the inlet with a conforming fit to arrest fluid flow while being free to move further into the flange subsequent to the arrest of flow, and a shape retaining ring embedded in the free end of the flange and acting to support the free end of the flange against collapse when the valving member is withdrawn.

13. A thermostatic valve having a chamber with an inlet and an outlet, a substantially cylindrical seat through which fluid flows from the inlet to the outlet, a valving member slidable into the seat to a greater or lesser extent with a conforming flow-arresting fit and having a limited drift movement while in its closed position, and a thermostat fixedly related and operatively connected to the valving member for normally moving the same into the seat sufficiently to arrest the fluid flow therethrough while being free to impart drift movement to the member in accommodation of the temperature fluctuations.

14. A thermostatic valve having an inlet and an outlet with an interposed seat member, a valve member, one of said members having an annular flexible flange responsive to the inlet pressure when the valve is closed and receiving the companion member for relative sliding movement therein, and thermostatic means connected to the movable one of said members for moving it into and out of valving relation with the other member.

15. A thermostatic valve having a chamber with an inlet and an outlet, a seat member interposed between the inlet and outlet, a valving member cooperating with the seat, and thermostatic means connected to the movable one of said members for moving the same with respect to the companion member for opening and closing communication between the inlet and the outlet, one of said members having an annular elastic flange anchored at one end to slidably receive the other member in valving relation, the opposite end of the flange being open to the inlet pressure for being flexed thereby to seal the communication between the inlet and the outlet to fluid flow while permitting thermostatic movement of the valve beyond an initial communication closing position.

HERBERT TOMOSER.

REFERENCES CITED

The following references are of record in the file of this patent:

UNITED STATES PATENTS

| Number | Name | Date |
|---|---|---|
| 357,829 | Holmes | Feb. 15, 1887 |
| 458,247 | Charles | Aug. 25, 1891 |
| 1,320,944 | Thoens | Nov. 4, 1919 |
| 1,945,745 | Jauvert | Feb. 6, 1934 |
| 2,217,880 | Woodson | Oct. 15, 1940 |
| 2,351,086 | Wells | June 13, 1944 |
| 2,394,345 | Werner | Feb. 5, 1946 |

FOREIGN PATENTS

| Number | Country | Date |
|---|---|---|
| 1,570 | Great Britain | June 18, 1861 |